US006487582B2

(12) United States Patent
Kim

(10) Patent No.: US 6,487,582 B2
(45) Date of Patent: *Nov. 26, 2002

(54) MULTI-USER INTERACTIVE WEB SERVER AND COMMUNICATION METHOD BETWEEN USERS USING THE SAME

(75) Inventor: Juh-han Kim, Suwon (KR)

(73) Assignee: Samsung Electronics Co., Ltd., Kyungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,846

(22) Filed: Jul. 21, 1998

(65) Prior Publication Data

US 2001/0042106 A1 Nov. 15, 2001

(30) Foreign Application Priority Data

Aug. 6, 1997 (KR) ............................................ 97-37570

(51) Int. Cl.[7] ............................................... G06F 15/16
(52) U.S. Cl. ........................ 709/204; 709/200; 709/202; 709/203; 709/205; 709/217; 709/227; 709/237; 707/10
(58) Field of Search .................... 709/218, 200–203, 709/204–207, 217–219, 224–229, 237, 238, 245–246; 707/9–10, 513; 463/41–43; 370/351–356

(56) References Cited

U.S. PATENT DOCUMENTS

| 5,406,557 | A | * | 4/1995 | Baudoin ..................... 709/206 |
| 5,558,339 | A | * | 9/1996 | Perlman ..................... 463/42 |
| 5,694,544 | A | * | 12/1997 | Tanigawa et al. ............ 709/204 |
| 5,793,972 | A | * | 8/1998 | Shane ........................ 709/219 |
| 5,835,724 | A | * | 11/1998 | Smith ........................ 709/227 |
| 5,838,921 | A | * | 11/1998 | Speeter ...................... 709/227 |
| 5,915,097 | A | * | 6/1999 | Chao .......................... 709/238 |
| 5,918,017 | A | * | 6/1999 | Attanasio et al. ........... 709/224 |
| 5,948,054 | A | * | 9/1999 | Nielsen ....................... 709/200 |
| 5,956,484 | A | * | 9/1999 | Rosenberg et al. .......... 709/203 |
| 5,960,173 | A | * | 9/1999 | Tang et al. .................. 709/201 |
| 5,974,441 | A | * | 10/1999 | Rogers et al. ............... 709/200 |
| 5,974,442 | A | * | 10/1999 | Adams ........................ 709/200 |
| 5,983,003 | A | * | 11/1999 | Lection et al. .............. 709/202 |
| 6,018,774 | A | * | 1/2000 | Mayle et al. ................. 709/203 |
| 6,035,337 | A | * | 3/2000 | Redpath et al. ............. 709/206 |
| 6,058,250 | A | * | 5/2000 | Harwood et al. ........... 709/227 |
| 6,252,869 | B1 | * | 6/2001 | Silverman ................... 370/352 |
| 6,356,934 | B1 | * | 3/2002 | Delph ......................... 709/204 |

FOREIGN PATENT DOCUMENTS

| EP | 0 747 844 | 12/1996 | ........... G06F/17/30 |
| JP | 5-207029 | 8/1993 | ........... H04L/12/28 |
| JP | 6-21975 | 1/1994 | ........... H01L/12/66 |
| JP | 7-6140 | 1/1995 | ........... G06F/15/16 |
| JP | 7-306875 | 11/1995 | ........... G06F/17/30 |
| JP | 9-101924 | 4/1997 | ........... G06F/13/60 |
| JP | 9-128343 | 5/1997 | ........... G06F/15/00 |

* cited by examiner

Primary Examiner—Bharat Barot
(74) Attorney, Agent, or Firm—Sughrue Mion, PLLC

(57) ABSTRACT

A multi-user interactive web server and a communication method between users using the same are provided. The web server for providing predetermined information to users connected through a network includes a network connection manager for providing web information thereof to the connected users and a multi-user manager having a function of exchanging user information between users connected to the network connection manager. According to the present invention, it is possible to exchange information between the users connected to the same web server as well as to use the web information, using the multi-user interactive web server including a server having a function of providing the web information and a server having a function of performing communication between the connected users, and the communication method between users using the same.

11 Claims, 2 Drawing Sheets

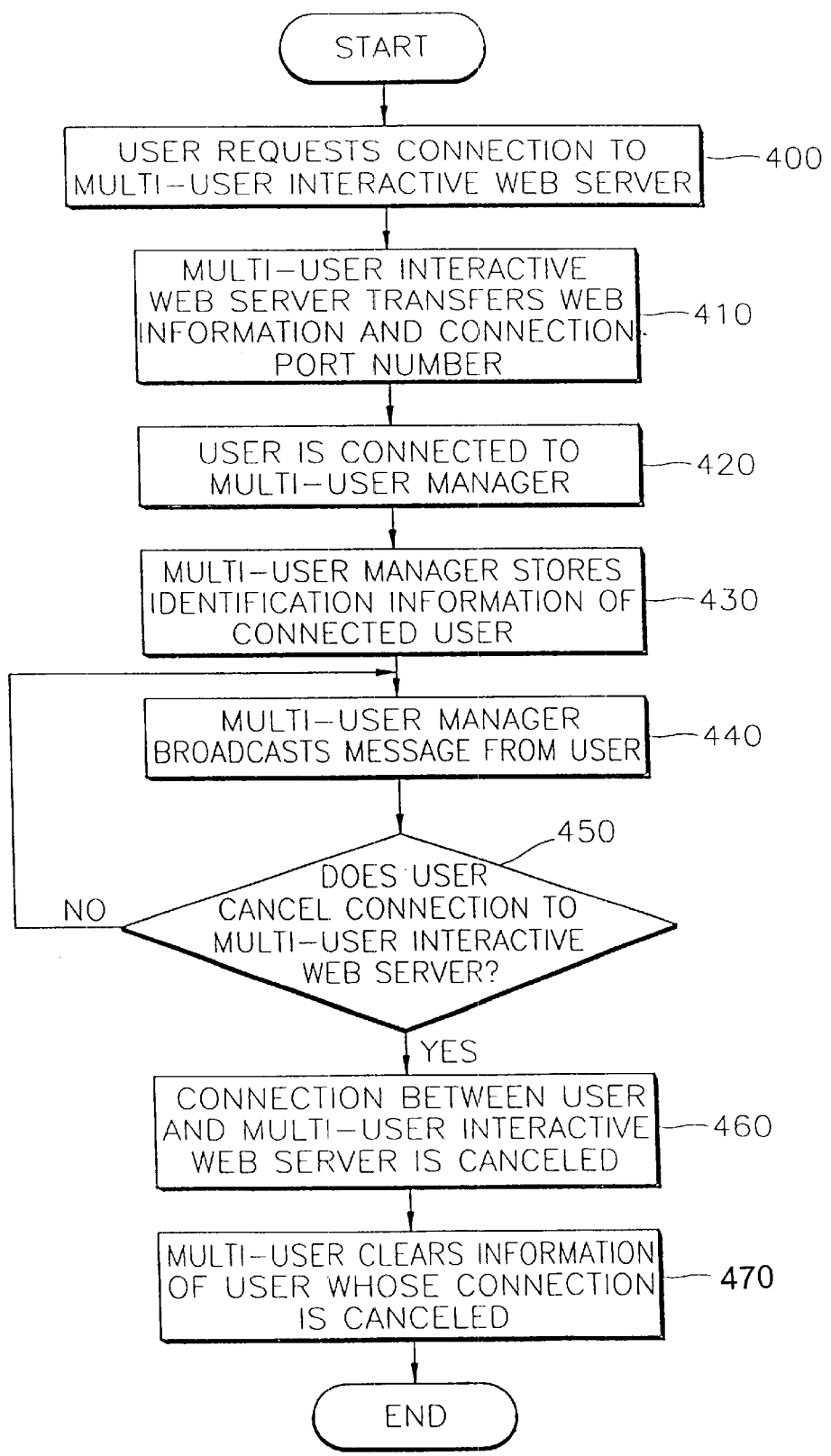

MULTI-USER INTERACTIVE WEB SERVER AND COMMUNICATION METHOD BETWEEN USERS USING THE SAME

BACKGROUND OF THE INVENTION

1. Field of the Invention

The present invention relates to a multi-user interactive web server and a communication method between users. Specifically, this invention relates to: a multi-user interactive web server that provides information to a user, while also allowing communication between users; and a communication method between users.

2. Description of the Related Art

In general, users connect to a web server through a network using web browsers. Presently, a user can only download information provided by the connected web server. The web server does not provide a means of exchanging information between users connected to a web server.

FIG. 1 shows a conventional way of requesting and transferring information between a user and a web server. A user 100 is connected to a web server 120 through a network 110. The user connects using the user's web browser and receives desired information from the web server 120.

The conventional web server 120 merely provides information contained in web pages or a related service to the user 100, as shown in FIG. 1. It is not possible for the user 100 to obtain information based on other user's experience, such as the most useful information in the searched web page, from the other users connected to the same web server 120. Similarly, the user cannot provide such information to the other users because the conventional web server 120 does not provide a way of exchanging information between users connected to the web server.

SUMMARY OF THE INVENTION

To solve the above problem(s), it is an objective of the present invention to provide a multi-user interactive web server that allows users to exchange information between users as well as provide web-based information to a user.

It is another objective of the present invention to provide a communication method using such a web server.

Accordingly, to achieve the first objective, there is provided a multi-user interactive web server for providing information to users connected through a network, comprising a network connection manager for providing web information thereof to the connected users; and a multi-user manager for exchanging user information between users connected to the network connection manager.

The multi-user manager preferably comprises a user manager for storing user identification information transferred by the users; and a message processor for processing messages, wherein when a user sends a message having the user identification information of other users to whom said message is to be transferred, the message is transferred to said other users based on the user identification information stored in the user manager.

The network connection manager preferably provides a port number to a user so that the user is connected to the multi-user manager.

To achieve the second objective, there is provided a method for exchanging information between users connected to a web server, the method comprising providing web information and allowing a user to exchange user messages on receiving a request for connection; receiving and storing identification information from said user and other users; and checking for identification information of a subset of said other users and transferring user messages on receiving said user messages. The first step preferably comprises the steps of indicating port number of a predetermined web server, said web server being capable of managing user-to-user communication, the port number being used for transmitting messages between all the users connected to the web server; and transmitting the port number and opening a channel with the web server.

Preferably, when a user terminates connection with the web server, the web server erases user identification information thereof stored in the second step.

Preferably, if a user message contains user identification information of a subset of other users then the message is transferred only to the subset of users and if the user message does not contain any user identification information of other users the message is broadcast to all other users.

Preferably along with a transferred user message a program is provided to process the message. Further improvements include the program being in the Java programming language.

BRIEF DESCRIPTION OF THE DRAWING(S)

The above objective(s) and advantage(s) of the present invention will become more apparent by describing in detail a preferred embodiment thereof with reference to the attached drawing(s) in which:

FIG. 4 is a flow chart of a communication method between users using the multi-user interactive web server of FIG. 2.

DESCRIPTION OF THE PREFERRED EMBODIMENT(S)

Hereinafter, the present invention will be described in detail with reference to the attached drawings.

Figure 1:
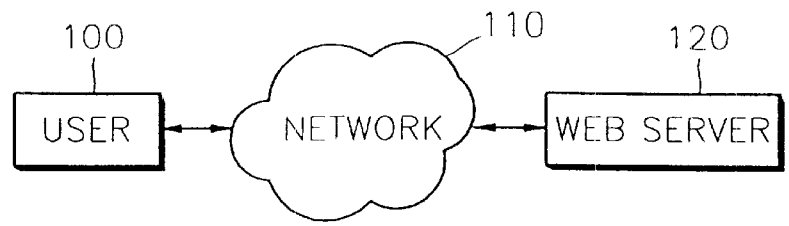
FIG. 1 shows a conventional network transferring a signal between a user and a web server.
Figure 2:
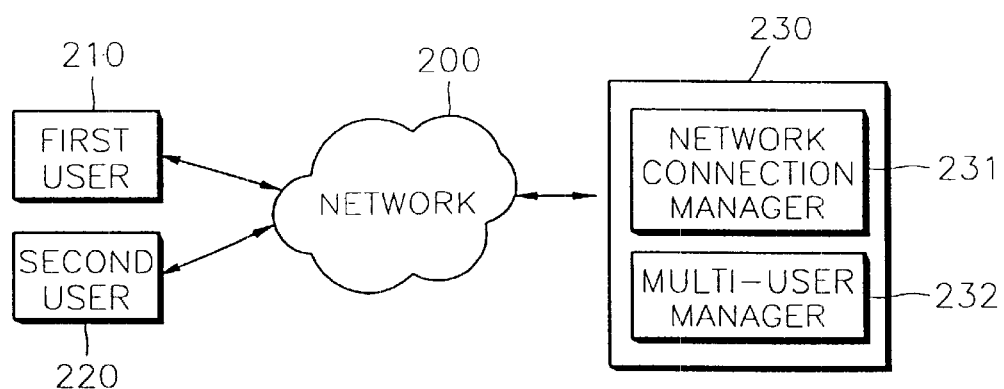
FIG. 2 shows an embodiment of a network system for describing the present invention.

FIG. 2 is an embodiment of a network system of the present invention. Said system comprises a network 200, a first user 210, a second user 220, and a multi-user interactive web server 230. The network 200 is a communications net in which computers used by users who wish to perform data communications are connected to a transfer apparatus. In this system an exchange apparatus is used for performing data communication on a communication line. The first and second users 210 and 220 use general user terminals and request information from the web server 230 through the network 200. The first and second users also download information. The first and second users 210 and 220 each have a web browser program that enables them to navigate around the web, for reading the web-based documents. The web browser also is used for connecting and communicating with the web server 230. The interface apparatus of the first and second users 210 and 220, such as a monitor and a speaker, outputs the web-based information, the identification names of other users connected to the web server 230, and messages sent to the multi-user interactive web server 230 by other users. The multi-user interactive web server 230 provides the web-based information to the first and second users 210 and 220 through the network 200 and allows information exchange between the first user 210 and the second user 220. The multi-user interactive web server 230 includes a network connection manager 231 and a multi-user manager 232. The network connection manager 231 determines connection and termination based on requests from the first or second users 210 and 220. The network connection manager also provides the web-based information. The network connection manager 231 performs all the functions of the conventional web server 120 shown in FIG. 1. The multi-user manager 232 is a server for allowing information exchange between the first user 210 and the second user 220.

Figure 3:
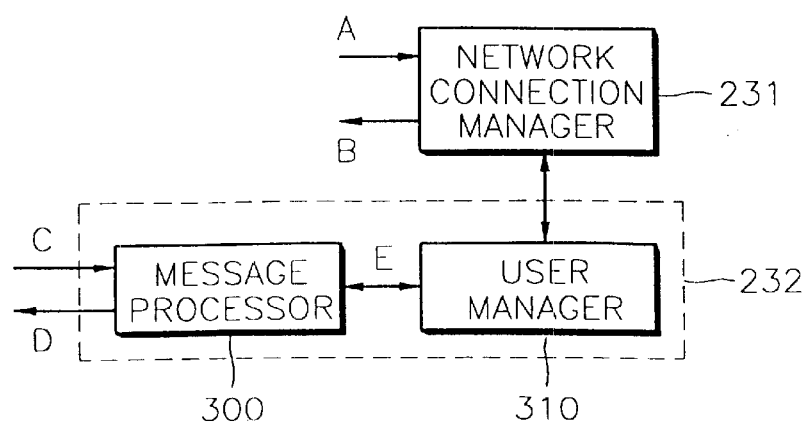
FIG. 3 shows the detailed structure of a multi-user interactive web server according to the present invention.

FIG. 3 shows an embodiment of a multi-user interactive web server 230 according to the present invention. The multi-user interactive web server 230 comprises a network connection manager 231 and a multi-user manager 232. The network connection manager 231 receives a connection request (A) from the first user 210 or the second user 220. It then allows the establishment of a connection, and transfers the web-based information (B) to the connected user. It also transfers a predetermined connection port number so that the user can be connected to the multi-user manager 232. When the multi-user manager 232 receives the predetermined connection port number from the user, it initiates connection with the user. When the multi-user manager 232 receives identification information of a user that requests termination of connection from the network connection manager 231, it terminates connection with the user that has the corresponding identification information and erases the identification information.

The multi-user manager 232 comprises a message processor 300 and a user manager 310. The message processor 300 receives a predetermined message (C) sent from the first user 210 or the second user 220 and transfers the message to a user or users connected to the web server. The message sent from a user has the identification information of other users to whom the message is to be transferred. The user manager 310 stores the identification information (E) of the users connected to the multi-user manager 232. The users connected to the multi-user manager 232, such as the first user 210 and the second user 220, send their identification information whenever the message between the users is sent. Accordingly, the multi-user manager 232 is capable of knowing the user who transfers the message. When a message which includes the identification information of other users is transferred, the message processor 300 transfers the message to the users based on the identification information stored in the user manager 310. The user manager broadcasts the newly received message (D) to all the users registered in the user manager 310 if the message does not include the identification information of other users to whom the message is intended. The message is output to the monitor or the speaker of the recipient users. When a user terminates connection with the web server 230, the user manager 310 receives the identification information of this user. The user manager then erases the stored information of the user. Data such as the above-mentioned A, B, C, and D and a program for processing them are plugged into the web browsers included in the first and second users 210 and 220 of FIG. 2.

FIG. 4 is a flowchart showing a communication method between users of the multi-user interactive web server 230 of FIG. 2. First, the first user 210 or the second user 220 requests connection to the multi-user interactive web server 230 (step 400). The network connection manager 231 which comprises a web server receives the connection request of the first or second user 210 or 220. The multi-user interactive web server 230 downloads web-based information to the user that requested connection and transmits the connection port number that allows connection to the multi-user manager 232 (step 410). The first user 210 or the second user 220 sends the received connection port number to the multi-user manager 232 and is connected to the multi-user manager (step 420). The users send the identification information including the address or the name thereof and is registered on the multi-user manager 232 (step 430). When the first user 210 or the second user 220 transmits a message for other user or users of the multi-user interactive web server 230 together with the identification information thereof, the user manager 232 broadcasts the message to specific user(s) included in the message or to all the users when the users information for specific users are not included in the message (step 440). Information can be exchanged between only those users whose identification information is stored in the multi-user manager 232. Programs which can process information to be exchanged between the users 210 and 220 and the multi-user manager 232 can also plugged-in at the web browser.

In a preferred embodiment a program for processing messages to be exchanged between users and the multi-user manager 232 is downloaded to the users together with the message. This program can be used for processing the information received from the multi-user interactive web server 230. This program is preferably in the Jave programming language. When the first user 210 or the second user 220 desires to terminate connection with the multi-user interactive web server 230 (step 450), the user informs the network connection manager 231 of the termination of its connection and then the connection is terminated (step 460). The network connection manager 231 needs to inform the multi-user manager 232 of the identification information of the user whose connection is terminated. The identification information of the user whose connection with the network connection manager 231 is terminated is cleared from the user manager 310 of the multi-user manager 232 (step 470).

As mentioned above, information is exchanged between web server users by providing the web server a function of managing user information corresponding to the users of a web server.

According to the present invention, it is possible to exchange information between users connected to the web server, as well as to use the web information, by using the multi-user interactive web server including a server having a function of providing the web information and a server having a function of performing communication between the connected users, and the communication method between users using the same.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A multi-user interactive web server for providing information to users connected through a network, the multi-user interactive web server comprising:

a network connection manager for providing a web-based document thereof to connected users, wherein the web-based document comprises at least a first web-based document page; and a multi-user manager for exchanging user information among users simultaneously connected to the network connection manager, thus enabling communication between two or more of said simultaneously connected users while said simultaneously connected users view said web-based document page.

2. The multi-user interactive web server of claim 1, wherein the multi-user manager comprises:

a user manager for storing user indentification information transferred by the users; and a message processor for processing messages, wherein when a user sends a message having the user identification information of other users to whom said message is to be transferred, the message is transferred to said other users based on the user identification information stored in the user manager.

3. The multi-user interactive web server of claim 1, wherein the network connection manager provides a port number to a user so that the user is connected to the multi-user manager.

4. A multi-user interactive web server according to claim 1, wherein said network is a wide-area-network.

5. A multi-user interactive web server according to claim 1, wherein said network is an internet.

6. A method of exchanging information among users connected to a web server, comprising:

(a) the web server providing a web-based document and allowing a user to exchange user messages on receiving a request for connection;

(b) the web server receiving and storing indentification information from said users and other users;

(c) the web server checking indentification of a subset of said other users and transferring user message on receiving said user messages while allowing the subset of said users to view the web-based document.

7. The method of claim 6, wherein step (a) comprises:

(a)(i) indicating port number of a predetermined web server, said web server being capable of managing user-to-user communication, the port number being used for transmitting messages among all the users connected to the web server; and (a)(ii) transmitting the port number and opening a channel with the web server.

8. The method of claim 6, further comprising:

(d) erasing said user identification when a user terminates connection with the web server.

9. The method of claim 6 wherein, if a user message contains user identification information of a subset of other users then the message is transferred only to the subset of users and if the user message does not contain any user identification information of other users the message is broadcast to all other users.

10. The method of claim 6 wherein along with a transferred user message a program is provided to process the message.

11. The method of claim 10 wherein the program is a program in the Java programming language.

* * * * *